(Model.)
3 Sheets—Sheet 1.
W. J. HUTCHINS.
CHECK ROWER ATTACHMENT FOR CORN PLANTERS.
No. 269,940.
Patented Jan. 2, 1883.
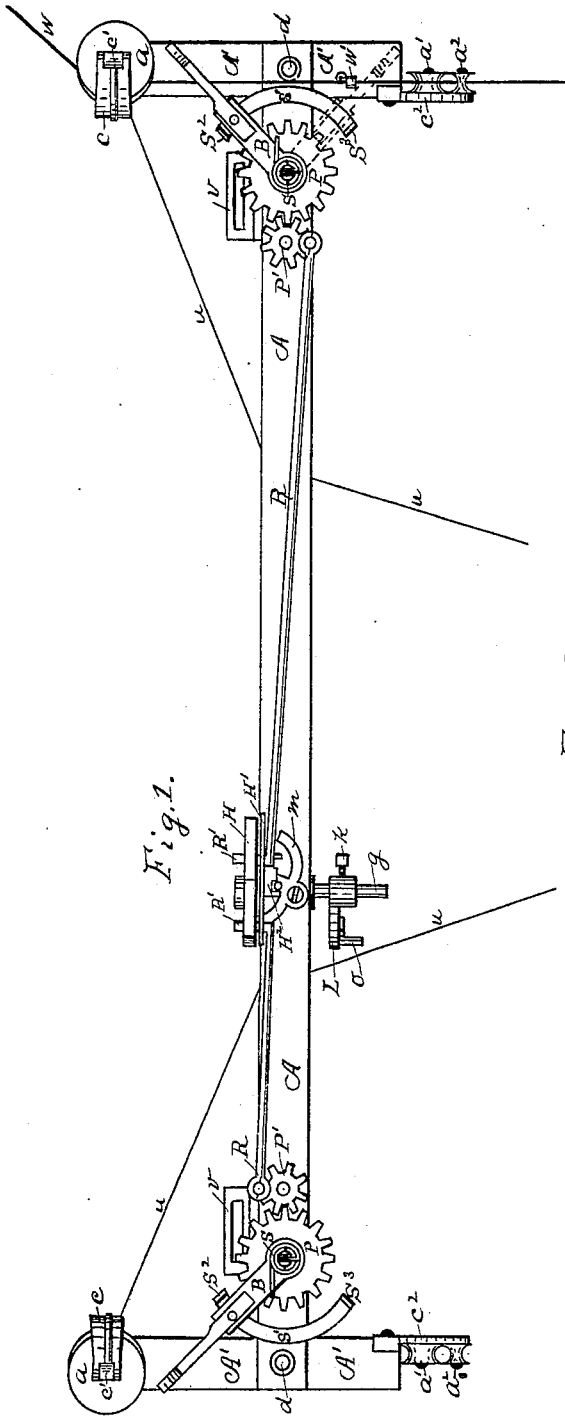
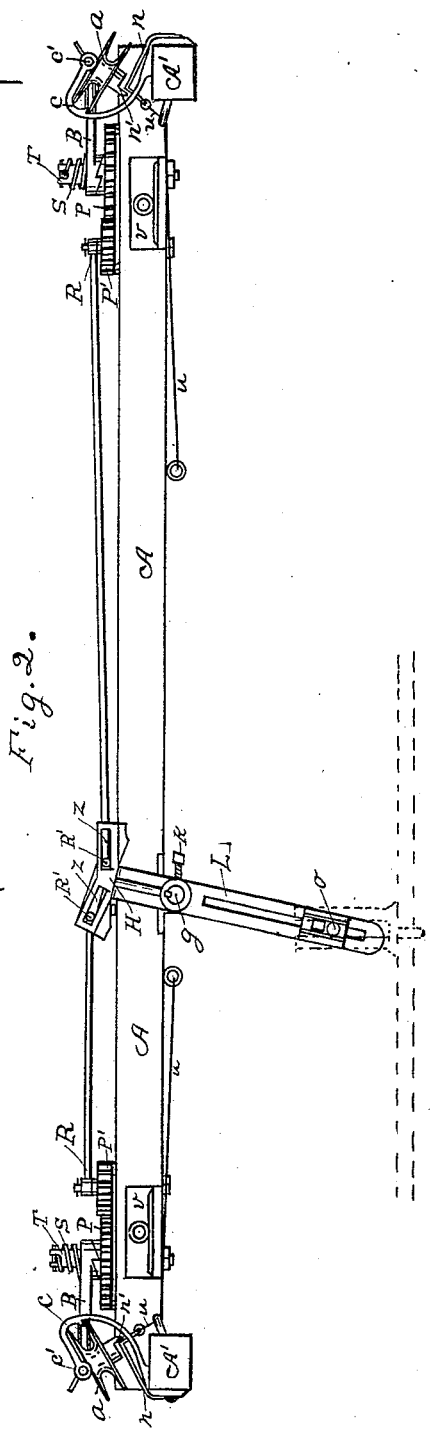
Witnesses
Thos. H. Hutchins
J. B. Curtis
Inventor,
William J. Hutchins.

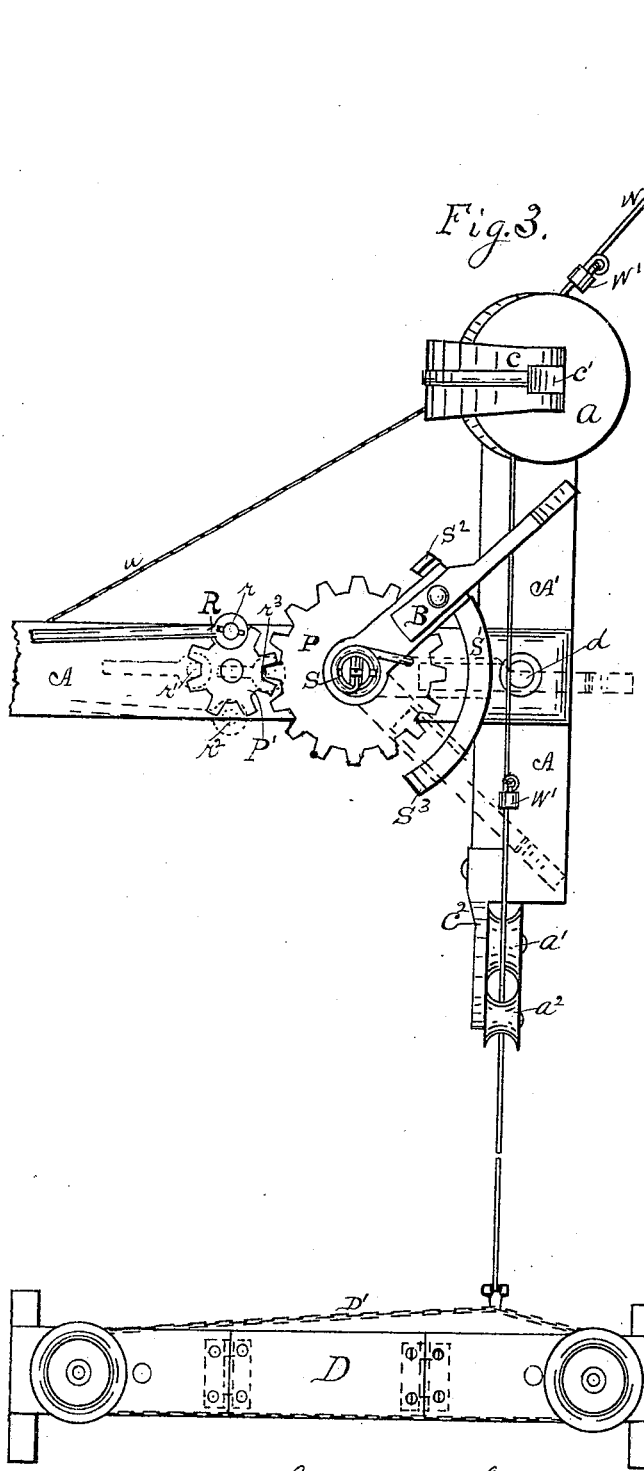

(Model.)
W. J. HUTCHINS.
CHECK ROWER ATTACHMENT FOR CORN PLANTERS.
No. 269,940.
Patented Jan. 2, 1883.
3 Sheets—Sheet 3.
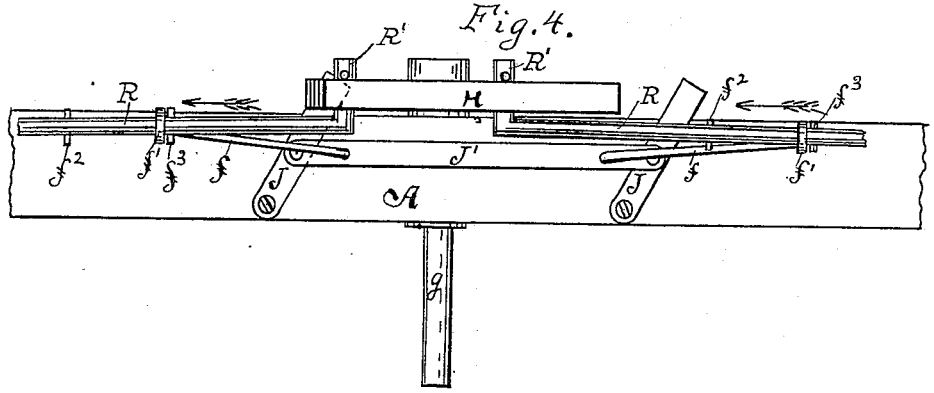
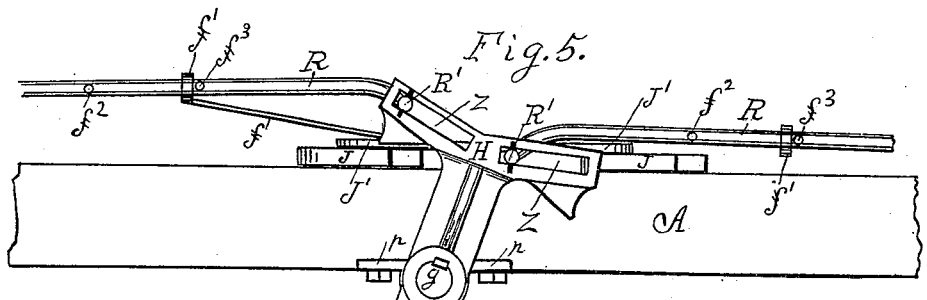
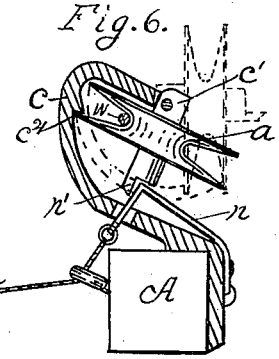
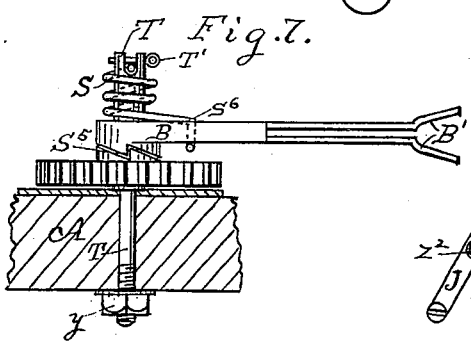
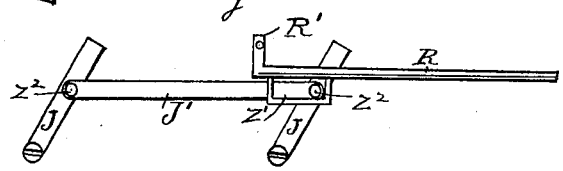
Witnesses.
Thos. H. Hutchins
J. B. Curtis
Inventor.
William J. Hutchins.

UNITED STATES PATENT OFFICE.

WILLIAM J. HUTCHINS, OF JOLIET, ILLINOIS, ASSIGNOR OF ONE-HALF TO ISRAEL B. CURTIS, OF SAME PLACE.

CHECK-ROWER ATTACHMENT FOR CORN-PLANTERS.

SPECIFICATION forming part of Letters Patent No. 269,940, dated January 2, 1883.

Application filed October 6, 1882. (Model.)

To all whom it may concern:

Be it known that I, WILLIAM J. HUTCHINS, of the city of Joliet, Will county, and State of Illinois, have invented certain new and useful Improvements in Check-Rower Attachments for Seed-Planters, the construction and operation of which I will proceed to explain, reference being had to the annexed drawings and the letters and figures thereon, making a part of this my specification, in which—

Figure 1 is a plan view on top; Fig. 2, a side elevation; Fig. 3, a plan view on the top of one end, showing the manner in which the forked lever engages with the knots on the wire, and the manner in which the wire is anchored at the end of the field; Fig. 4, a top view of the center movement; Fig. 5, a side view of the center movement; Fig. 6, a sectional view of the wire dumping sheave and standard; Fig. 7, a side view showing the manner in which the spring and radial offsets are attached, and Fig. 8 a top view of the locking device.

The object of this invention consists in an attachment to seed-planters for the purpose of dropping seed in checks in the field by the use of a knotted wire stretched across the field in such a manner that the knots on the wire will engage with the machine at intervals, causing it to move the seed-slide of the planter at each engagement, thus dropping the corn or seed at each knot, so the rows of seed, when planted, will be straight both ways across the field; and the nature of this invention consists in a frame arranged across a seed-planter, supported by suitable castings, and provided with the necessary machinery to drop the seed, as stated.

Referring to the drawings, A represents the main beam, having the ordinary cross-heads, A', at either end, arranged to support the sheave-wheels $a$, $a'$, and $a^2$, by means of the standards $c$ and $c^2$, in such a manner as to take up and guide the knotted wire $w$ across the machine.

B is a forked lever, pivoted on the stud T, which passes through it, and upon which it oscillates by means of the knots $w'$ on the wire $w$ in between the forks of the lever B. The hub of the lever B, through which the stud T passes is formed with radial vertical offsets $S^5$ on its under side, which engage with corresponding radial vertical offsets on the upper side of the pinion P, which also turns on the stud T, and is held down to its work by the spiral spring S. The spring S has its upper end held in a recess in the top of the stud T by the key T', while its lower end terminates in a hook behind the rear of the lever B, so its tension will cause the forked lever B to return after the knot $w'$ on the wire $w$ has passed out over the end of the said lever at B'. More or less tension is given to the spring S by turning the stud T in the beam A, by loosening the nut $y$, and, after turning the stud T sufficiently, tightening the nut $y$ again, thus regulating the tension of the spring S to any desired pressure. The segment-guide S', having the upturned stops $S^2$ and $S^3$, controls the distance the forked lever B is to travel. As the lever B turns on the stud T it causes the pinion P to turn also by means of the radial vertical offsets of the lever B engaging with those of the pinion P. The pinion P meshes into and rotates the pinion P', which is one-half the diameter of pinion P. The length of the segment-guide S' is such that it permits the lever B to move far enough to turn the pinion P one-fourth way around while the pinion P' turns one-half way around. The pinion P' is furnished on its upper face with a wrist-pin, $r$, on which is journaled one end of the connecting-rod R, while the opposite end of the rod R terminates in the hook R', hooked into the slot Z of the upright rocking head H. The head H has two slots, Z, for the purpose of retaining the hooked ends of the rods R from each end of the machine. The lower end of the head H is keyed on one end of the short rocking-shaft $g$, and attached to the under side of the beam A by the box $p$, Fig. 5. One end of the rocking shaft $g$ is arranged to project from the box $p$ far enough to hold the drop-lever L, which is adjusted by the set-screw K, while its lower end is slotted to adjust the drop-pin $o$. As the pinion P receives its motion from the lever B it turns with it the pinion P', which imparts motion to the head H by means of the rod R, and as the lever B is moved by the knot $w'$ on the wire $w$ until it is at right angles with the knotted wire $w$, the pinion P has turned only one-eighth way around, which has turned the pinion P' only one-fourth way around, bringing the wrist-pin $r$ from the side of the pinion P′, as shown in Fig. 3, to $r'$. (Shown by dotted lines.) As the pinion P′ is thus turned it has pushed the rod R toward the center of the machine to its full extent, pushing with it the head H, tilting it in the opposite direction from where it started, and as the lever B completes its stroke it turns the pinion P another one-eighth way around, making in one stroke of the lever a one-fourth turn of said pinion, causing the pinion P′ to complete its one-half turn, pulling the rod R back to $r^2$ on the opposite side of the pinion on a line opposite from where it started, sliding the hooked end R′ of the rod R across and to the other side of the slot Z, ready to make another like stroke in the other direction to move the seed-slide.

Sometimes, when the machine travels over uneven ground or in consequence of the parts working too free, the seed-slide will rebound after it has made its drop of the seed. In order to prevent this, I use a lock to hold it locked after it has been moved either way. This locking consists of a pair of arms, J, (shown in Figs. 4, 5, and 8,) having one end pivoted on the top of the beam A and the two connected by the bar J′ by the posts $Z^2$, forming a joint at that place. The posts $Z^2$ pass up through a loop, Z′, on the side of the rod R, as shown in Fig. 8; or the bar J′ may be connected to the rod R by the pitman $f$, sleeved thereon, as shown in Fig. 4, and working between the two pins $f^2$ and $f^3$. When the rod R moves it moves with it the bar J′ in a reciprocating manner, so the outer ends of the arms J are passed alternately under the projecting lugs on the under side of the slotted portion of the head H for the purpose of locking it at its full stroke either way to prevent a rebound of the seed-slide. The loop Z′ is a little shorter than the slots Z in the head H, so when the rod R moves either way the loop Z′ strikes the post $Z^2$ first, before the hook R′ in the slot Z strikes the end of the slot Z to move the head, so the arms J will be removed from under the said projecting lugs of the head H before it is tilted, so as to be out of the way, so it can tilt, as aforesaid. The arms J are thus being alternately passed under either side of the rocking head H to prevent it from returning until released, as stated. Thus the seed slide is locked at each move until it is desired to remove it, which is done automatically as each knot engages with the machine.

For the purpose of dumping or disengaging the knotted wire from the machine I use the swinging sheave $a$. (Shown more particularly in Fig. 6.) The spindle on which the sheave revolves is hinged at the upper end to the outer end of the overhanging standard $c$ at $c'$, while its lower end engages with and is held by the spring $n$ by means of the catch $n'$. A cord, $u$, is attached to said spring $n$ and runs to the operator. When it is desired to disengage the wire $w$ from the sheave $a$ and from the machine a pull on the cord $u$, which pulls down the spring $n$, will permit the inner flanges of the sheave $a$ to turn down, as shown by dotted lines in Fig. 6, to let the knotted wire $w$ fall out, and as the machine turns around the wire $w$ will turn out from between the sheave-wheels $a'$ and $a^2$. The projecting lug $c^4$ on the inner side of the standard $c$ is arranged to overhang the inner edge of the lower flange of the sheave-wheel $a$ to prevent the wire $w$ from becoming disengaged from the sheave $a$ when not desired.

When the machine is in operation the knotted wire $w$ is placed, as shown in Fig. 3, so the knots $w'$ will engage with the forked lever B at intervals across the field, and is anchored at each end of the field by means of an anchor, as shown in Fig. 3, so that as the machine returns after having crossed the field the wire $w$ will be shifted nearer the machine on its return by means of the anchor arranged for that purpose. As the machine is thus arranged it completes the drop of the seed when the lever B has only traveled one half its distance, and when the lever B is at right angles with the wire $w$, so that the knot $w'$ cannot pass the lever B before the seed is dropped, while the balance of the stroke simply sets the machine ready for another drop, and as one end of the machine operates the hooked end of the rod R on the opposite end is allowed to slide back and forth in the slot Z and not move or interfere with the machinery on that end of the machine.

Heretofore in machines of this character it has required the full stroke or movement of the forked lever B to give a full movement to the seed-slide to drop the seed, thereby causing the seed to be strung along in a row on the ground, instead of dropping the seed in a compact hill, as in this machine. I consider this quick drop one of the most important features in my invention. When the forked lever B has been carried back by the knot $w'$ one-half its stroke the rod R has moved a full stroke to drop the seed, and when the forked lever B has completed its full stroke the rod R has been moved or reciprocated once back and forth, to move the rocking head H one way and return said rod R in the slot Z, ready to move it again, as before. This reciprocating movement of the rod R, which moves at twice the speed of the lever B, I believe to be an entirely new movement in check-rowers and of great importance, as it permits the drop-lever L and seed-slide to make the drop almost instantly, which I believe is not accomplished in any other machine of the kind.

Having thus described my invention, what I claim as new and useful, and desire to secure by Letters Patent, is as follows, to wit:

1. In a check-rower attachment for seed-planters, the forked lever B, having the radial vertical offsets, the pinion P, having corresponding radial vertical offsets, the pinion P′, having the wrist-pin $r$, spring S, stud T, reciprocating rod R, journaled on the wrist-pin $r$ and having the opposite hooked end R' to reciprocate in the slots Z of the rocking head H, the slotted rocking head H, shaft $g$, boxed to the beam A, and drop-lever L, all arranged as set forth to actuate the seed-slide in the manner described.

2. In a check-rower attachment for seed-planters, the pinions P and P', and forked lever B, adapted to rock the slotted rocking head H to drop the seed by means of the hooked rod R when the lever B has traveled only one-half its distance and setting the hook R' of the rod R in the opposite end of the slot Z of the head H, ready for another stroke in the other direction when the lever travels the last one-half of its distance by means of the knot $w'$ on the wire $w$, all in combination as set forth.

3. In a check-rower attachment for seed-planters, the combination of the beam A, cross-heads A', sheave-wheels $a$, $a'$, and $a^2$, segment-track S', forked lever B, pinions P and P', stud T, having the recess across its upper end, spring S, pitman-rod R, slotted rocking head H, shaft $g$, supported by the box $p$ and drop-lever L, as and for the purpose set forth.

4. In a check-rower attachment for seed-planters, the arms $j\,j$, pivoted on the top of the beam A and connected by the bar J', in combination with the rod R, having the loop Z' to engage with the pin $Z^2$ and oscillate said arms alternately under the sides of the rocking head H, for the purpose set forth.

5. In a check-rower attachment for seed-planters, the sheave-wheel $a$, having one end of its spindle $c'$ hinged in the upper end of the standard $c$, to suspend said sheave $a$ so the inner flanges of the sheave $a$ will turn down and outward to discharge the wire $w$, in combination with the detent-spring $r$, adapted to engage with the lower end of the spindle $c'$, as and for the purpose set forth.

6. In a check-rower attachment for seed-planters, the forked lever B, pinions P and P', rod R, and rocking head H, all adapted to move the seed-slide its full throw either way by one-half the stroke of the forked lever B, as and for the purpose set forth.

WILLIAM J. HUTCHINS.

In presence of—
 I. B. CURTIS,
 THOS. H. HUTCHINS.